US 9,079,668 B2

(12) United States Patent
Gee et al.

(10) Patent No.: US 9,079,668 B2
(45) Date of Patent: Jul. 14, 2015

(54) INTEGRATED LAVATORY GALLEY MONUMENT

(71) Applicant: C&D ZODIAC, INC., Huntington Beach, CA (US)

(72) Inventors: Kyle Gee, Los Angeles, CA (US); Marisa Ouchi, Costa Mesa, CA (US); Nicholas Lee, Huntington Beach, CA (US); Scott Savian, Huntington Beach, CA (US)

(73) Assignee: C&D Zodiac, Inc., Huntington Beach, CA (US)

( * ) Notice: Subject to any disclaimer, the term of this patent is extended or adjusted under 35 U.S.C. 154(b) by 326 days.

(21) Appl. No.: 13/765,396

(22) Filed: Feb. 12, 2013

(65) Prior Publication Data

US 2013/0206904 A1    Aug. 15, 2013

Related U.S. Application Data

(60) Provisional application No. 61/598,774, filed on Feb. 14, 2012.

(51) Int. Cl.
*B64D 11/00* (2006.01)
*B64D 11/02* (2006.01)
*B64D 11/04* (2006.01)

(52) U.S. Cl.
CPC ............... *B64D 11/02* (2013.01); *B64D 11/04* (2013.01); *Y02T 50/46* (2013.01)

(58) Field of Classification Search
CPC .... B64D 11/04; B64D 11/02; B64D 22/0023; B64D 2011/0046
See application file for complete search history.

(56) References Cited

U.S. PATENT DOCUMENTS

| D155,335 | S | * | 9/1949 | Delcher, Jr. et al. | ......... D12/195 |
| D155,363 | S | * | 9/1949 | Ray et al. | ............ D12/195 |
| 6,696,979 | B2 | | 2/2004 | Manten | |
| 7,198,228 | B2 | | 4/2007 | Mills et al. | |
| 7,222,820 | B2 | | 5/2007 | Wentland et al. | |
| 7,562,844 | B2 | | 7/2009 | Boren | |
| 7,780,114 | B2 | | 8/2010 | Doebertin et al. | |
| 7,954,761 | B2 | | 6/2011 | Johnson et al. | |
| 8,040,257 | B2 | | 10/2011 | Ferro et al. | |
| 8,087,611 | B2 | | 1/2012 | Arnold et al. | |
| 8,469,311 | B2 | * | 6/2013 | Saint-Jalmes et al. | ..... 244/118.5 |

(Continued)

FOREIGN PATENT DOCUMENTS

| EP | 1473225 | 11/2004 |
| EP | 1520783 | 4/2005 |

(Continued)

OTHER PUBLICATIONS

International Search Report and Written Opinion issued on Apr. 15, 2013 in related PCT/US2013/025957 application.

*Primary Examiner* — Philip J Bonzell
(74) *Attorney, Agent, or Firm* — Jeffer Mangels Butler & Mitchell LLP; Brennan C. Swain, Esq.

(57) ABSTRACT

A monument assembly configured to be positioned interior of an aircraft that includes a galley module, a first lavatory module and a second lavatory module. The module is positioned between the first and second lavatory modules, and the first lavatory module and the galley module share a first inboard dividing wall that includes at least a first non-vertical wall section.

17 Claims, 4 Drawing Sheets

(56) References Cited

U.S. PATENT DOCUMENTS

| | | |
|---|---|---|
| 2003/0025036 A1 | 2/2003 | Farnsworth |
| 2009/0261200 A1* | 10/2009 | Saint-Jalmes et al. ..... 244/118.5 |
| 2010/0288881 A1 | 11/2010 | Helfrich et al. |
| 2011/0215199 A1 | 9/2011 | Lee et al. |
| 2011/0253835 A1 | 10/2011 | Cook et al. |
| 2012/0012706 A1 | 1/2012 | Ehlers et al. |
| 2012/0085862 A1 | 4/2012 | Pangalila |

FOREIGN PATENT DOCUMENTS

| | | |
|---|---|---|
| EP | 1592614 | 11/2005 |
| EP | 1768902 | 4/2007 |
| EP | 2094564 | 9/2009 |
| EP | 2213571 | 8/2010 |
| EP | 2316733 | 5/2011 |
| WO | 9726153 | 7/1997 |
| WO | 2004076279 | 9/2004 |
| WO | 2005066022 | 7/2005 |
| WO | 2006087168 | 8/2006 |
| WO | 2007118028 | 10/2007 |
| WO | 2010021594 | 2/2010 |
| WO | 2010084005 | 7/2010 |
| WO | 2010092047 | 8/2010 |
| WO | 2010108780 | 9/2010 |
| WO | 2010120811 A2 | 10/2010 |
| WO | 2011089567 | 7/2011 |
| WO | 2011133576 | 10/2011 |

* cited by examiner

US 9,079,668 B2

INTEGRATED LAVATORY GALLEY MONUMENT

CROSS REFERENCE TO RELATED APPLICATIONS

This application claims the benefit of U.S. Provisional Application No. 61/598,774, filed Feb. 14, 2012, which is herein incorporated by reference in its entirety.

FIELD OF THE INVENTION

The present invention relates generally to an aircraft integrated lavatory galley monument.

BACKGROUND OF THE INVENTION

Commercial aircraft, such as the Airbus A320 or Boeing 737, are typically constructed from modular components; the size, weight and construction of which are dictated by many considerations, including fuselage dimensions, aesthetics and safety. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include galleys for use by the crew for storing food and the like and lavatories for use by the crew and passengers.

Lavatories and galleys on commercial aircraft have traditionally been separate monuments. Each structure is isolated in terms of structure, plumbing, electric power, and geometry. Lavatories and galleys are arranged and installed in aircraft separately.

A typical lavatory has a rectangular footprint, a toilet, and a sink. It usually has four composite panel walls, which may be molded to fit the curvature of the plane, and a ceiling with built in lighting. The lavatory monument secured to the aircraft via various tie-rods and brackets, and is designed to independently conform to FAA loading standards.

A typical galley also has a rectangular footprint. Space is allocated for food service carts, as well as standard "galley inserts," such as ovens, coffee makers, chillers, and storage containers. The monument is secured to the aircraft via various tie-rods and brackets, and is designed to independently conform to FAA loading standards.

SUMMARY OF THE PREFERRED EMBODIMENTS

In accordance with a first aspect of the present invention there is provided. A monument assembly configured to be positioned in the interior of an aircraft that includes a galley module, a first lavatory module and a second lavatory module. The galley module is positioned between the first and second lavatory modules, and the first lavatory module and the galley module share a first inboard dividing wall that includes at least a first non-vertical wall section. In a preferred embodiment, the second lavatory module and the galley module share a second inboard dividing wall that includes at least a second non-vertical wall section. Preferably, the first lavatory module, galley module and second lavatory module include a shared rear wall. In a preferred embodiment, the monument assembly includes a first sink positioned on the first non-vertical wall section and a second sink positioned on the second non-vertical wall section. Preferably, the galley module includes a counter that is unitary with the first and second non-vertical wall sections. In a preferred embodiment, the galley module includes cart storage space defined therein, and at least a portion of the first and second sinks are positioned vertically above the cart storage space.

In accordance with another aspect of the present invention there is provided an aircraft that includes cabin that defines a cabin interior and a monument assembly positioned within the cabin interior. The monument assembly includes a galley module, a first lavatory module and a second lavatory module. The galley module is positioned between the first and second lavatory modules, and the first lavatory module and the galley module share a first inboard dividing wall that includes at least a first non-vertical wall section. In a preferred embodiment, the galley module includes cart storage space defined therein that includes at least first and second carts positioned therein, and at least a portion of the first sink is positioned vertically above at least a portion of the first cart, and at least a portion of the second sink is positioned vertically above at least a portion of the second cart. Preferably, the aircraft includes a center aisle positioned with the cabin, a private service area defined adjacent the galley module, and a divider monument that separates the private service area and the center aisle. In a preferred embodiment, the divider monument divides the center aisle adjacent the divider monument into first and second passenger lavatory paths that end at the first and second lavatory modules, respectively.

In accordance with another aspect of the present invention there is provided an aircraft that includes a cabin that defines a cabin interior, a monument assembly positioned within the cabin interior that includes a first lavatory module, second lavatory module and a galley module positioned between the first and second lavatory modules, a center aisle positioned within the cabin, a private service area defined adjacent the galley module, and a divider monument that separates the private service area and the center aisle. In a preferred embodiment, the aircraft includes first and second curtains that extend between the center divider monument and the monument assembly and that at least partially define the private service area and the first and second passenger lavatory paths.

It will be appreciated by those skilled in the art that the walls between the lavatory modules and the galley module include at least one and possibly many "non-vertical" wall sections that cause the wall to be "joggled" thereby optimizing the space between the joined lavatory-galley-lavatory monument. In a preferred embodiment, by having the lavatory footprint smaller, but the shoulder space wider, the lavatory "feels" wider to an occupant, while keeping the footprint smaller. For the galley module, the lower space is typically used for storing carts, while the upper space is easily variable for different applications.

In a preferred embodiment, the integrated lavatory and galley monument assembly is a single monument that can be positioned and secured in an aircraft as a single unit. This allows the separate galley and lavatory modules to share walls. Sharing walls instead of doubling up by positioning separate monuments next to one another can provide savings in weight, space, and cost. Additionally, plumbing between the galley and lavatory modules can be shared, which can also provide savings in terms of weight, space, and cost.

Furthermore, as is known in the art, separate monuments within an aircraft must pass force loading tests. As an integrated monument assembly or unit, the present invention spreads the interface loads to the whole unit.

The present invention also provides an inventive layout of the aft area of the cabin of an aircraft. In this layout, an "island" monument, divider, curtain, screen or the like splits the center aisle of a single-aisle aircraft into two access aisles or passenger lavatory paths. In a preferred embodiment, the aircraft includes curtains running from the center divider monument to the galley module on either side. This provides the flight attendants with privacy, while working at the galley, and still maintains easy access to the lavatories on either side.

DETAILED DESCRIPTION OF THE PREFERRED EMBODIMENTS

Figure 1:
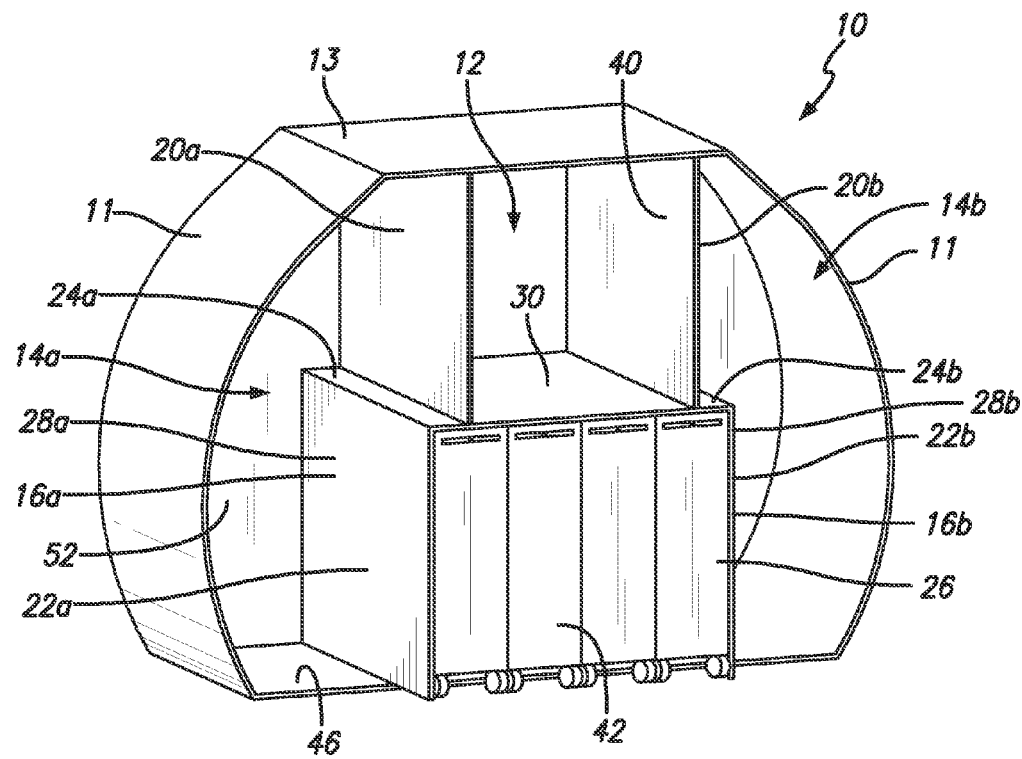
FIG. 1 is a perspective view of an integrated lavatory and galley monument assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of their synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-6 show embodiments of an integrated lavatory and galley monument assembly 10. In particular, the invention can be used on commercial passenger aircraft (generally in the aft section). However, this is not a limitation on the present invention and the integrated lavatory and galley monument assembly 10 can be used elsewhere.

Figure 2:
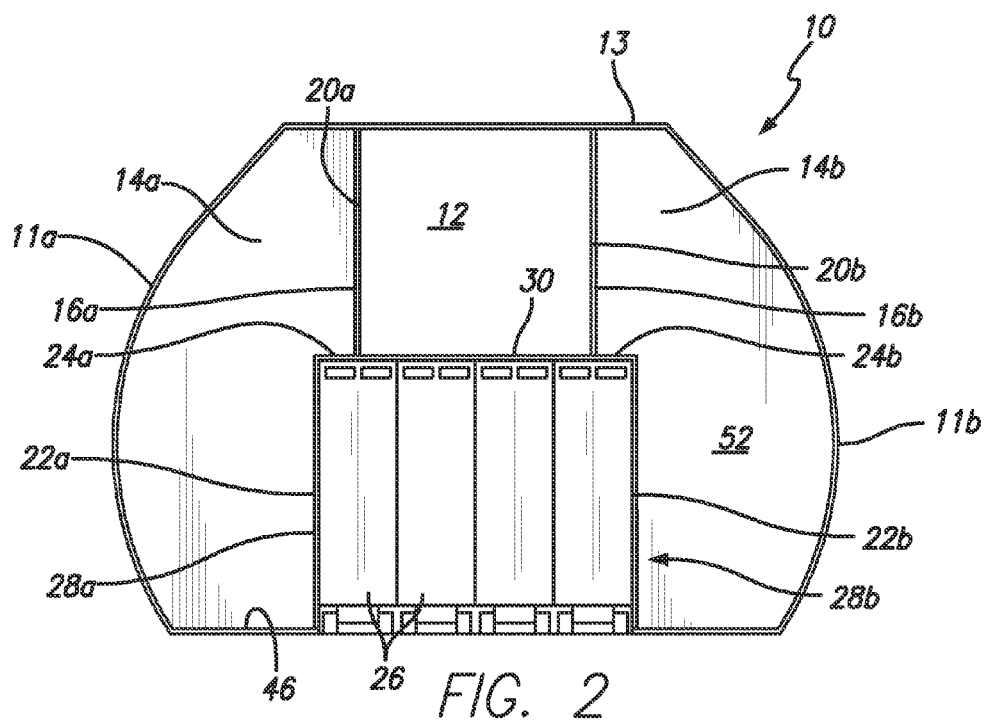
FIG. 2 is a front elevational view of an integrated lavatory and galley monument assembly.

As shown in FIGS. 1 and 2, the present invention integrates the galley module 12 and the first and second lavatory modules 14*a* and 14*b* into one assembly. FIGS. 1 and 2 show an integrated lavatory and galley monument assembly 10 as a unitary structure that includes the galley module 12 and first and second lavatory modules 14*a* and 14*b*. Additionally, the invention includes an aft layout for a single aisle narrow body aircraft that splits the aft section of the plane into two aisles via a center divider monument 18 to create a private service area 32 (see FIG. 3).

The integrated lavatory and galley monument assembly 10 includes first and second lavatory modules 14*a* and 14*b* (positioned outboard) with a galley module 12 positioned therebetween. In a preferred embodiment, the integrated lavatory and galley monument assembly 10 is designed such that walls are shared between the first and second lavatory modules 14*a* and 14*b* and the galley module 12. Additionally, in a preferred embodiment, power and plumbing are integrated/shared between the first and second lavatory modules 14*a* and 14*b* and the galley module 12.

The integrated lavatory and galley monument assembly 10 is preferably a single unit that includes first and second side walls 11*a* and 11*b*, floor 46, rear wall 52 and upper wall 13, and is designed to fully meet FAA loading requirements. As will be appreciated by those skilled in the art, within the cabin of an aircraft, monuments are typically secured to attachment points, such as hard points and overhead and side attachments. Accordingly, a description of the attachment of the integrated lavatory and galley monument assembly will be omitted.

As shown in FIGS. 1-2, the integrated lavatory and galley monument assembly 10 includes first and second inboard dividing walls 16a and 16b that at least partially define the inboard shape of both the first and second lavatory modules 14a and 14b and run generally parallel to the axis of the aircraft. In a preferred embodiment, first inboard dividing wall 16a includes a first upper wall section 20a (that extends generally vertically), a first lower wall section 22a (that extends generally vertically), and a first non-vertical wall section 24a positioned therebetween. Second inboard dividing wall 16b preferably includes a second upper wall section 20b (that extends generally vertically), a second lower wall section 22b (that extends generally vertically), and a second non-vertical wall section 24b positioned therebetween. As shown in FIG. 2, the first and second non-vertical wall sections allow a portion of a trolley cart 26 to protrude into the lower portion of the lavatory space. As will be appreciated by those of ordinary skill in the art, these first and second protrusions 28a and 28b decrease the footprint of the first and second lavatory modules 14a and 14b, but preserve the passenger shoulder-width space in the lavatory.

Figure 3:
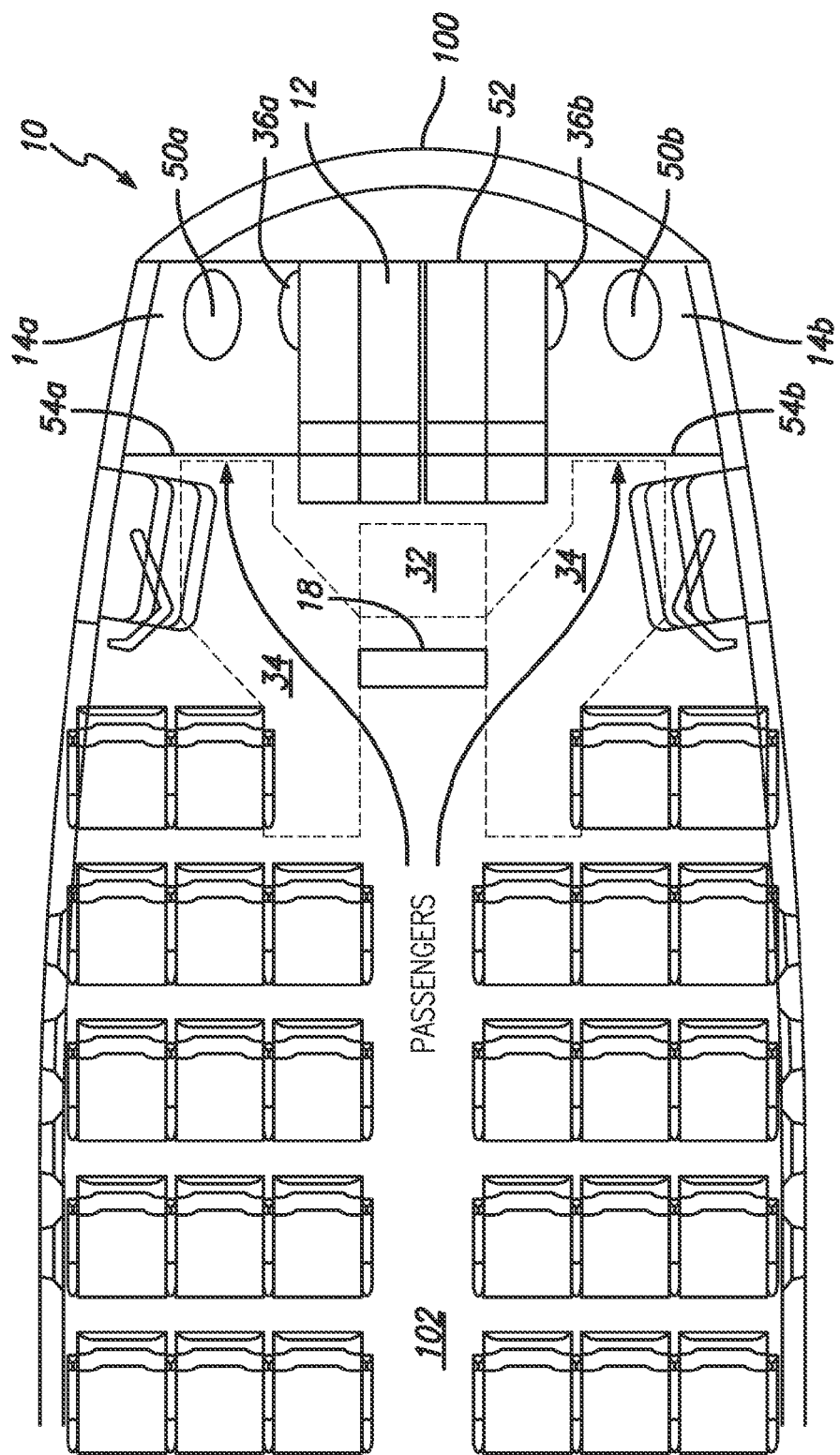
FIG. 3 is a top plan view of a portion of an aircraft with the integrated lavatory and galley monument assembly of FIG. 1 positioned therein and showing crew and passenger traffic with a divider monument.
Figure 5:
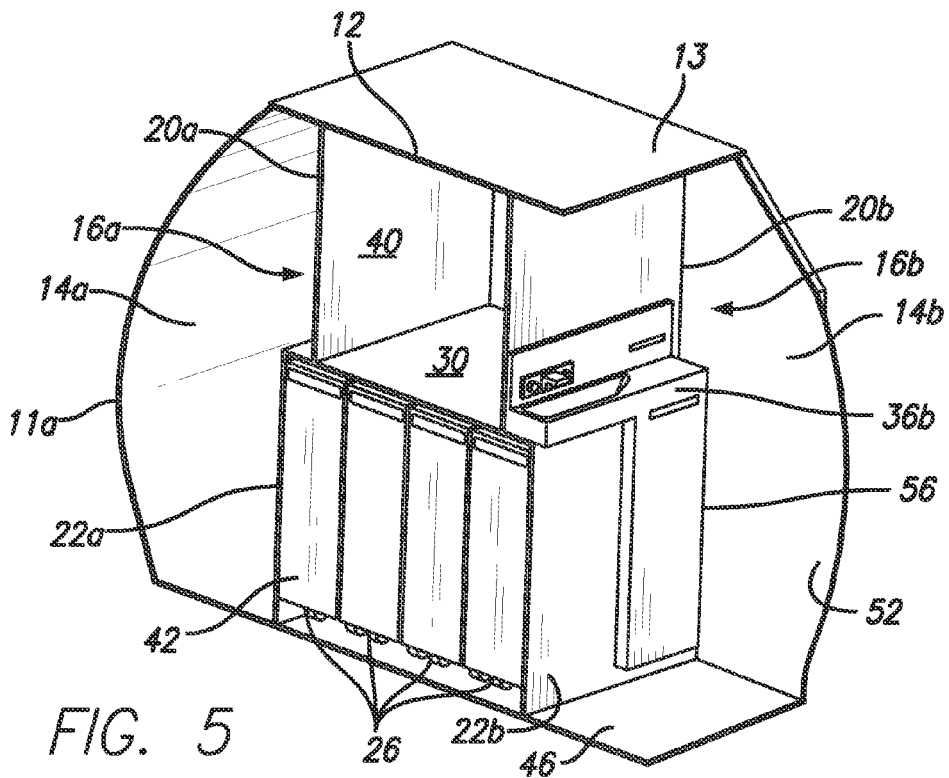
FIG. 5 is a perspective view of the integrated lavatory and galley monument assembly of FIG. 1 with a portion cut away and showing a sink positioned in one of the lavatories and on the non-vertical wall section.
Figure 6:
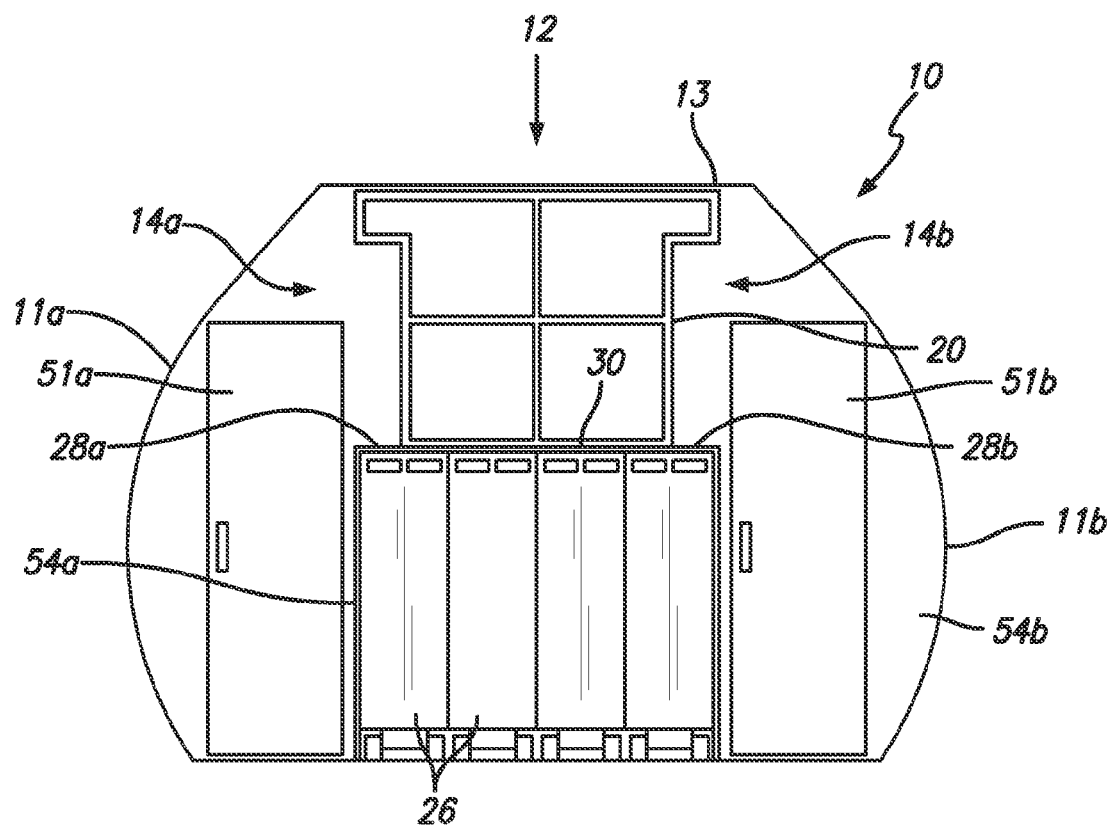
FIG. 6 is a front elevational view of and integrated lavatory and galley monument assembly in accordance with another preferred embodiment of the present invention.

FIGS. 1, 2 and 5 show the integrated lavatory and galley monument assembly 10 without any front wall on the first and second lavatory modules 14a and 14b or any components within the first and second lavatory modules 14a and 14b. However, those of ordinary skill in the art will appreciate that in operation, and as shown in FIGS. 3 and 6, the first and second lavatory modules 14a and 14b preferably include a front wall 54a and 54b, sinks 36a and 36b, toilets 50a and 50b, doors 51a and 51b and a rear wall 52 shared with the galley module 12. Any arrangement of the sinks, toilets and other components of the lavatories is within the scope of the present invention. Also, the doors can be any type of door, such as a bi-fold or a hinged door.

In other embodiments, first and second inboard dividing walls 16a and 16b include more than one shared non-vertical wall section, as shown in FIG. 6. In another embodiment, the sinks can be positioned elsewhere in the lavatory, and the first and second non-vertical wall sections 24a and 24b can be used as a shelf or the like.

As shown in FIGS. 1-2, in a preferred embodiment, the galley module 12 is divided into an upper section 40 and a lower section 42 that are separated by a counter 30. In a preferred embodiment, first and second non-vertical wall sections 24a and 24b in the first and second lavatory modules 14a and 14b are unitary with and a part of counter 30. However, this is not a limitation on the present invention. The lower section 42 is preferably designed such that it is a trolley cart space so that a number of trolley carts 26 are able to fit lengthwise, in a generally rectangular footprint. In a preferred embodiment, first and second lower wall sections 22a and 22b extend further forwardly (as shown in FIG. 1) than the floor 46 of the integrated lavatory and galley monument assembly 10, to allow the trolley carts 26 to be covered by first and second lower wall sections 22a and 22b and counter 30, but so that the wheels of the trolley carts 26 are positioned forward of the floor 46. In another embodiment, as shown in FIG. 5, the trolley carts 26 can be positioned on the floor 46. In another embodiment, the floor 46 can be omitted. As shown in FIG. 1, in an exemplary embodiment, the galley module 12 includes four trolley carts 26 positioned side to side. The galley module 12 may be designed for a one and a half cart depth. However, this is not a limitation on the present invention.

In a preferred embodiment, the upper section 40 is designed to be a work area and storage space. For example, counter 30 can provide a working area for flight attendants. The upper section 40 can also include shelves, compartments and the like (see FIG. 6) that accommodate typical galley inserts, including but not limited to, coffee makers, ovens, chillers, sinks, and containers.

In a preferred embodiment, the width of the upper section 40 is one standard trolley cart-width less than that of the lower section 42. This geometry defines or forms the first and second protrusions 28a and 28b into the first and second lavatory modules 14a and 14b. It will be understood that the dimensions of the lavatory and galley modules (including the walls thereof) can be changed such that more or less carts can fit in the lower section 42 or more or less space is provided in the lavatories, etc. The dimensions discussed herein are not a limitation on the present invention.

Figure 4:
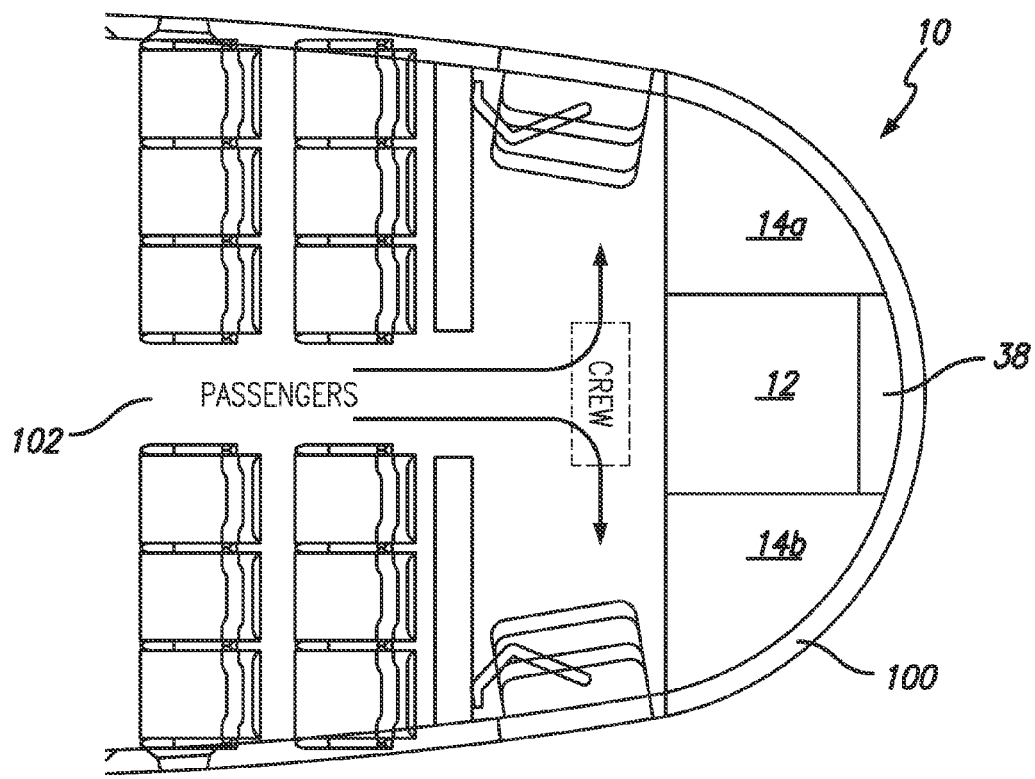
FIG. 4 is a top plan view of a portion of an aircraft with the integrated lavatory and galley monument assembly of FIG. 1 positioned therein and showing crew and passenger traffic without a divider monument.

In a preferred embodiment, when the integrated lavatory and galley monument assembly 10 is positioned within the cabin 100 of an aircraft 102, a center divider monument 18 is positioned as shown in FIG. 3 to help steer passenger traffic to the lavatories and away from the galley. Without this center divider monument 18, passengers may pass through the crew's working area, as shown in FIG. 4. With the center divider monument 18, a separate private service area 32 is created that is separated from the passenger lavatory area/path 34 for commercial aircraft on single aisle, narrow body planes. In an embodiment, as shown in FIG. 3, two seats can be removed (see the rear rows with only 2 seats per row), to better define the passenger lavatory area/path. The center divider monument 18 is preferably placed forward of the galley module 12 of the integrated lavatory and galley monument assembly 10. The center divider monument 18 is preferably positioned forward enough that the FAA required exit aisle is maintained, and such that a standard trolley cart 26 can be pulled out of the galley module 12 during use. The center divider monument 18 also provides structure for the attachment of flight attendant seats. In another embodiment, the center divider monument can be a curtain. Any structure that diverts passengers away from, and helps define, a separate crew working area is within the scope of the present invention and is considered a center divider monument. As shown in FIG. 3, in a preferred embodiment, the aircraft includes curtains 58 that extend between the center divider monument 18 to the integrated lavatory and monument 10 and that help define the private service area. The curtains 58 can be connected to the center divider monument 18 and the integrated lavatory and galley monument 10 or can be connected to the ceiling, as long as they are openable and closeable in the area shown in FIG. 3. This provides the flight attendants with privacy while working at the galley, and still maintains easy access to the lavatories on either side. As shown in FIG. 3, the curtains 58 at least partially define the private service area 32 and the first and second passenger lavatory paths 34.

As shown in FIG. 5, in a preferred embodiment, the sinks 36a and 36b in the first and second lavatory modules 14a and 14b can be positioned on (or may take the place of) first and second non-vertical wall sections 24a and 24b, such that each sink 36a and 36b is positioned over a portion of the lower section 42 or cart space. In this embodiment, the first and second non-vertical wall sections 24a and 24b can include a slight angle to provide for drainage of water in the sinks 36a and 36b. FIG. 5 also shows component 56, which can include items or components typically included in a lavatory, such as a paper towel or toilet dispenser, trash, etc. Also as shown in FIG. 4, in a preferred embodiment, the lower section 42 is divided into cart space and plumbing space 38 so that the plumbing 38 for one or both of the first and second lavatory modules 14a and 14b and the galley module 12 extends downwardly and is positioned behind the cart space 42. The plumbing space 38 can also include shared electrical components/wiring, etc.

It will be appreciated by those skilled in the art that the inclusion of the integrated lavatory and galley monument assembly 10 allows the lavatories that are typically positioned fore of the exit doors to be moved aft in the cabin 100, thereby saving space and allowing the addition of seats.

The integrated lavatory and galley monument assembly 10 can be used in an aircraft with an integrated galley and bin monument, such as the one taught in U.S. Patent Application No. 61/598,797 and simultaneously filed U.S. Patent Publication No. 20130206905, published Aug. 15, 2013, which are both incorporated herein in their entireties by reference. The integrated galley and bin monument includes a galley that has an overhanging portion that is integrated with an overhead bin. In many standard aircrafts, the aft galley fits six carts. In a preferred embodiment of the integrated lavatory galley monument, the galley fits four carts. When combined with two integrated galley and bin monuments, which each hold at least one cart, the two inventions hold six carts while providing extra room that can be used to add seats.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation the present invention. Other measurements can be used.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A monument assembly configured to be positioned in the interior of an aircraft, the monument assembly comprising:
   a galley module, a first lavatory module and a second lavatory module, wherein the galley module is positioned between the first and second lavatory modules, a first inboard dividing wall positioned between the first lavatory module and the galley module, wherein the first inboard dividing wall includes an upper section, a lower section and a first non-vertical wall section positioned between the upper section and the lower section, a second inboard dividing wall positioned between the second lavatory module and the galley module, wherein a storage space is defined between the lower section of the first inboard dividing wall and the second inboard dividing wall, and wherein the first non-vertical wall section is positioned directly above at least a portion of the storage space.

2. The monument assembly of claim 1 wherein the distance between the lower section of the first inboard dividing wall and the second inboard dividing wall is greater than the distance between the upper section of the first inboard dividing wall and the second inboard dividing wall.

3. The monument assembly of claim 1 wherein the second inboard dividing wall includes an upper section, a lower section and a second non-vertical wall section positioned between the upper section and the lower section, wherein the storage space is defined between the lower section of the first inboard dividing wall and the lower section of the second inboard dividing wall, and wherein the second non-vertical wall section is positioned directly above at least a portion of the storage space.

4. The monument assembly of claim 3 wherein the distance between the lower section of the first inboard dividing wall and the lower section of the second inboard dividing wall is greater than the distance between the upper section of the first inboard dividing wall and the upper section of the second inboard dividing wall.

5. The monument assembly of claim 3 wherein the first lavatory module, galley module and second lavatory module include a shared rear wall.

6. The monument assembly of claim 5 further comprising a first sink positioned on the first non-vertical wall section.

7. The monument assembly of claim 6 further comprising a second sink positioned on the second non-vertical wall section.

8. The monument assembly of claim 3 wherein the galley module includes a counter, and wherein the counter and the first and second non-vertical wall sections are co-planar.

9. The monument assembly of claim 8 wherein the galley module includes a counter, and wherein the counter and the first and second non-vertical wall sections are unitary.

10. An aircraft comprising
a cabin that defines a cabin interior,
a monument assembly positioned within the cabin interior, wherein the monument assembly includes a galley module, a first lavatory module and a second lavatory module, wherein the galley module is positioned between the first and second lavatory modules, a first inboard dividing wall positioned between the first lavatory module and the galley module, wherein the first inboard dividing wall includes an upper section, a lower section and a first non-vertical wall section positioned between the upper section and the lower section, a second inboard dividing wall positioned between the second lavatory module and the galley module, wherein a storage space is defined between the lower section of the first inboard dividing wall and the second inboard dividing wall, and wherein the first non-vertical wall section is positioned directly above at least a portion of the storage space.

11. The aircraft of claim 10 further comprising a cart positioned in the storage space, wherein at least a portion of the cart is positioned directly below the first non-vertical wall section.

12. The aircraft of claim 10 wherein the distance between the lower section of the first inboard dividing wall and the second inboard dividing wall is greater than the distance between the upper section of the first inboard dividing wall and the second inboard dividing wall.

13. The aircraft of claim 10 wherein the second inboard dividing wall includes an upper section, a lower section and a second non-vertical wall section positioned between the upper section and the lower section, wherein the storage space is defined between the lower section of the first inboard dividing wall and the lower section of the second inboard dividing wall, and wherein the second non-vertical wall section is positioned directly above at least a portion of the storage space.

14. The aircraft of claim 13 wherein the distance between the lower section of the first inboard dividing wall and the lower section of the second inboard dividing wall is greater than the distance between the upper section of the first inboard dividing wall and the upper section of the second inboard dividing wall.

15. The aircraft of claim 13 wherein the first lavatory module, galley module and second lavatory module include a shared rear wall.

16. The aircraft of claim 15 further comprising a first sink positioned on the first non-vertical wall section.

17. The aircraft of claim 16 further comprising a second sink positioned on the second non-vertical wall section.

* * * * *